United States Patent
Goldshtein et al.

(10) Patent No.: US 8,457,036 B2
(45) Date of Patent: Jun. 4, 2013

(54) STATISTICAL MULTIPLEXING IN A SATELLITE COMMUNICATION NETWORKS

(75) Inventors: Moti Goldshtein, Hod-Hasharon (IL); Yaron Katriel, Natanya (IL); Timor Blau, Ramat-Gan (IL); Isacc Ben Laish, Kfar Saba (IL); Magal Pinchas, Tel-Aviv (IL); Doron Elinav, Ramat-Gan (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 338 days.

(21) Appl. No.: 12/794,301

(22) Filed: Jun. 4, 2010

(65) Prior Publication Data
US 2010/0309839 A1    Dec. 9, 2010

Related U.S. Application Data (60) Provisional application No. 61/184,009, filed on Jun. 4, 2009.

(51) Int. Cl.
*H04B 7/185* (2006.01)
*H04L 12/28* (2006.01)

(52) U.S. Cl.
USPC ........................ 370/316; 370/401; 455/13.1

(58) Field of Classification Search
USPC .............. 370/252, 316, 319–322, 329, 330, 370/336, 337, 343–345, 347, 348, 401; 455/12.1, 13.1
See application file for complete search history.

(56) References Cited

U.S. PATENT DOCUMENTS

| | | | | |
|---|---|---|---|---|
| 2005/0105524 A1* | 5/2005 | Stevens et al. | ............... | 370/389 |
| 2009/0094680 A1* | 4/2009 | Gupta et al. | ..................... | 726/3 |
| 2009/0305699 A1* | 12/2009 | Deshpande et al. | .......... | 455/434 |
| 2010/0284325 A1* | 11/2010 | Yabo et al. | ................... | 370/322 |

* cited by examiner

*Primary Examiner* — Kerri Rose
(74) *Attorney, Agent, or Firm* — Banner & Witcoff, Ltd.

(57) ABSTRACT

A single, large-scale satellite access communication network may be configured as infrastructure for many small-scale subnets, wherein each subnet may be configured to serve a different organization (e.g. an SME) as a private network. Each subnet may be configured as a small star and/or mesh satellite data access network from the end-user perspective, yet all subnets may be configured to be part of the total large-scale network and share satellite bandwidth resources. Such configuration may yield significantly higher bandwidth efficiency, lower operation and equipment costs, minimized latency and ease of network operations for each of the small organizations sharing the large-scale network.

23 Claims, 9 Drawing Sheets

Fig 1a: Small Networks – Hierarchal Diagram

Fig. 1b: A Small Network – Connection Diagram

Fig. 8a: Star Topology
PRIOR ART

Fig. 8b: Mesh Topology
PRIOR ART

**Fig. 8c: Hybrid Topology
PRIOR ART**

**Fig. 8d: SCPC Topology
PRIOR ART**

STATISTICAL MULTIPLEXING IN A SATELLITE COMMUNICATION NETWORKS

RELATED APPLICATIONS

The present application is a non-provisional of U.S. Patent Application No. 61/184,009, entitled "Statistical Multiplexing in Satellite Communication Networks," filed Jun. 4, 2009, the contents of which are incorporated herein by reference in their entirety for all purposes.

FIELD OF THE INVENTION

This invention relates to the fields of satellite communication networks and more particularly to small-scale satellite communication networks.

BACKGROUND

Small-Medium Enterprises (SMEs) as well as other organizations (e.g. large corporations, government agencies, etc,) continuously use communication networks to enable remote branches and/or offices to access both an enterprise data center, typically located at the enterprise's headquarters (HQ), and the Internet. Accessing the enterprise data center may be required for example for intranet data processing, accessing central servers of various types (e.g. file storage facilities, electronic mail servers, etc), performing management tasks, conducting conference calls or video sessions within the enterprise or using Enterprise Resource Planning/Customer Relationship Management (ERP/CRM) systems or any other enterprise unique applications. Access to the Internet may be required since the Internet is a major source for information and data and provides connectivity on a global scale for numerous applications, such as access to web content, electronic mail exchange, etc. In some cases, connectivity to a wide area network (WAN) other than the Internet via the enterprise's head office (HO) may also be required, either instead of connectivity to the Internet or in addition to such, for example in order to provide services which might not be available at the enterprise HQ but may be available at the HO.

Figure 1A:
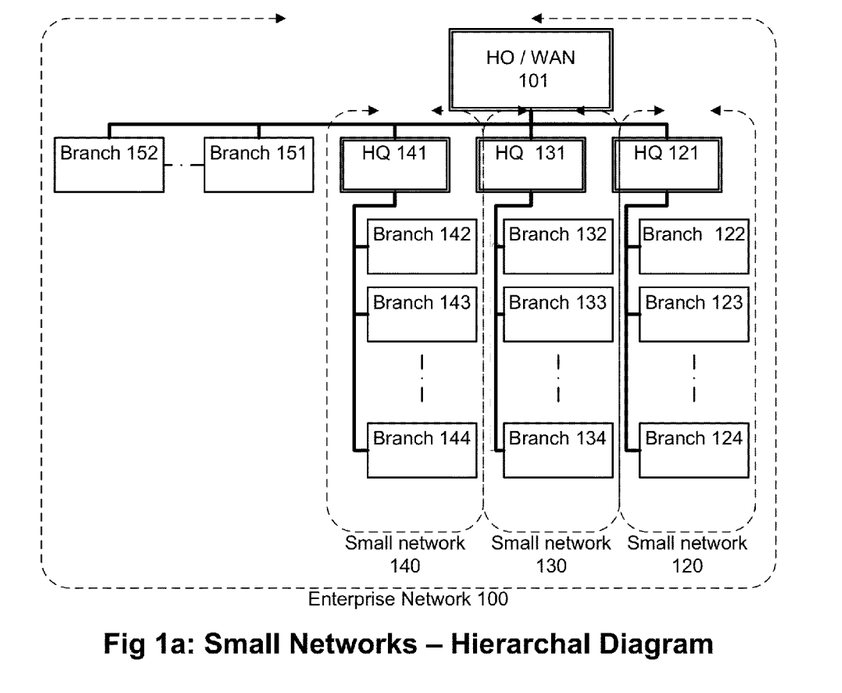
FIG. 1a shows a hierarchical topology of an illustrative enterprise network in accordance with some aspects of this invention.

FIG. 1a illustrates a hierarchical topology of an enterprise network 100, comprising a plurality of small networks (120, 130 and 140) and a corporate head office (HO 101). A small network, such as small network 120, may comprise a headquarters (HQ 121), which may act as a data center and host central servers as previously described, and plurality of branches (122 to 124). Network 120 may be connected to HO 101, which may act as a major source of information and data for several small networks (120 to 140). HO 101 may provide WAN connectivity to a corporate network or to the Internet. HO 101 may also be connected to a plurality of stand-alone branches (151, 152), which might not be part of any small network. HO 101 may provide these branches connectivity to the corporate network for example for accessing corporate data, accessing the Internet or conducting multimedia sessions with users either inside or outside the corporate network.

Figure 1B:
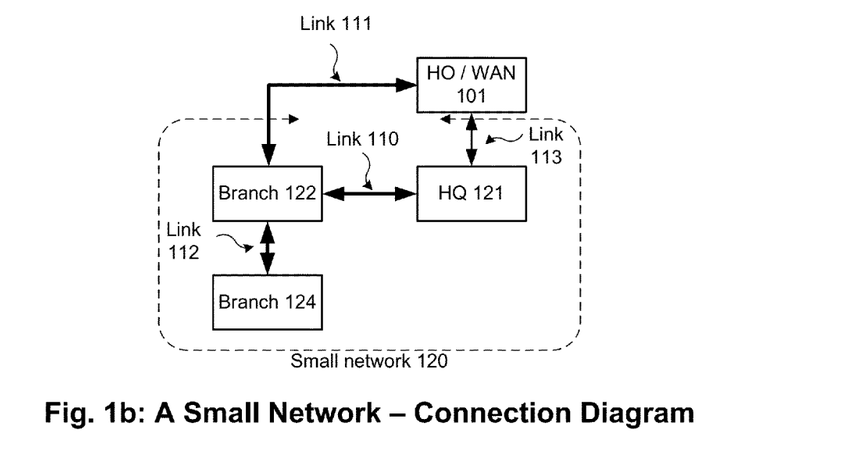
FIG. 1b shows a connection diagram for an illustrative network in accordance with some aspects of this invention.

FIG. 1b illustrates connectivity options of a single branch 122 within a small network 120. Link 110 may illustrate connectivity of branch 122 to HQ 121, for example for accessing data servers or conducting multimedia sessions (e.g. voice and/or video) with other users of small network 120. Link 111 may illustrate WAN connectivity of branch 122 via HO 101, for example for accessing the Internet, accessing corporate data or conducting multimedia sessions with users either inside or outside the corporate network. Link 112 may illustrate connectivity of branch 122 to another branch, e.g. branch 124, which may also be part of network 120, for example for data transfer between branches or for conducting multimedia sessions between the branches. Link 113 may illustrate connectivity of HQ 121 to the corporate WAN via HO 101, for example for accessing the Internet, accessing corporate data or conducting multimedia sessions with users either inside or outside the corporate network.

In some scenarios, enterprise network 100 may be configured as a satellite based communication network, for example in order to provide connectivity between the various offices where terrestrial infrastructure is unavailable or for backup and disaster recovery purposes (e.g. after earthquakes or other disasters which may affect terrestrial infrastructure). Furthermore, in some parts of the world, lack of Internet infrastructure results in gateways to the Internet (or to any other WAN) to be located very far from the corporate facilities, in some cases even in a different continent. For example, small networks in Africa may be connected to the Internet via gateways located in Europe, where the Internet backbone is easily accessible. In such networks, using connectivity over satellite is practically the only available option. In many of these cases, these satellite communication networks may be based on demand-assignment-multiple-access (DAMA).

A DAMA satellite network may support remote terminals with ambiguous data profiles, wherein the ambiguity may be manifested by a large data rate peak to average ratio. For example, a remote terminal may be used most of the time for exchanging electronic mail messages (which may be transmitted at relatively low rate regardless of message size) or for voice connectivity, but occasionally it may be required to transmit a high rate video stream. In order to achieve efficient use of bandwidth, such networks may be designed with sufficient bandwidth to support an average network data rate, while assuming oversubscription for remote terminals' peak rates over high throughput channels. If the network is large enough (hundreds of remote terminals) utilizing a statistical approach may be justified, as normally only a small number of remote terminals require their peak rate at any given time.

When attempting to apply DAMA techniques to a small-scale satellite network (for example tens of remote terminals), wherein a considerable volume of traffic may be exchanged between remote sites, inherent limitations of the topology may lead to utilizing bandwidth less efficiently (and perhaps even to cost ineffectiveness). The low number of terminals and a higher correlation between bandwidth requests from those remote terminals may render the statistical approach unjustified, resulting in less oversubscription (i.e. more bandwidth per remote terminal). Furthermore, a relatively high volume of traffic sent from remote terminals (i.e. over return channels to a hub or to other remote terminals, e.g. in mesh topology) compared to the volume of traffic sent from a hub to remote terminals (e.g. over a forward channel) also negatively affects the bandwidth efficiency. Inbound and mesh traffic may be transmitted using bursts over return channels (e.g. in accordance with DVB-RCS recommendations), which are less efficient than a continuous, statistically multiplexed carrier as the forward channel may be (e.g. in accordance with DVB-S2 recommendations). In addition, any overhead of management and control (hardware and bandwidth) may be divided between fewer users hence the overhead per user is higher. Consequently, in terms of bits per Hz, a small-scale DAMA network may be much less efficient than a regular DAMA network.

A network topology of small-scale networks using satellite access, for example like the one illustrated for example in FIG. 1a, poses several technological challenges, including the inherent latency over satellite links, the cost of equipment and operation of a satellite network (e.g. bandwidth efficiency), operation simplicity (as operation of a satellite network may require expertise not always existing in small organizations), broadband requirements, availability requirements, user experience requirements and support of interactive applications (e.g. VoIP or video conferencing).

According to the current state of the art of satellite communication networks, several solutions and technologies exist and may be used in order to support the above described topology, in varying degree of adequacy.

Figure 8A:
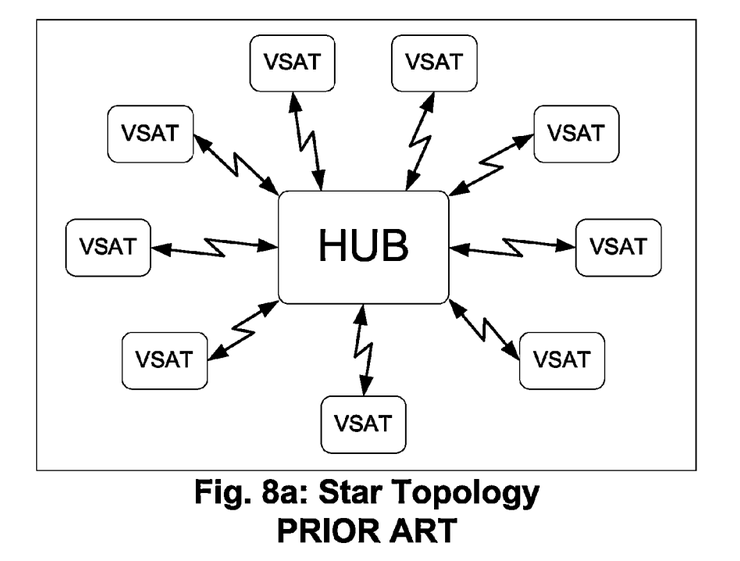

A widely used solution may be a VSAT (Very Small Aperture Terminal) network in star topology, comprising a hub and plurality of remote terminals (VSATs), for example as illustrated in FIG. 8a. The hub may be configured to aggregate all the traffic to and from the remote terminals and perform all network management and control tasks. The hub may be located at a data center and/or close to an Internet backbone access point in order to provide the required connectivity to the Internet and/or intranet. In some embodiments, the outbound link (hub to remote terminals) is a point to multipoint link, based on a continuous carrier with statistical multiplexing of data frames (for example in accordance with the DVB-S2 standard recommendations) and the inbound links (from remote terminals to the hub) are point to point links, based on burst transmissions over shared bandwidth media managed using an appropriate access scheme, for example, Multi-Frequency Time Division Multiple Access (MFTDMA).

A VSAT network in star topology may be typically used in networks where the number of VSATs is measured in hundreds or more. In such systems, relatively small VSAT antennas are often used (sub-meter for Ku-band in many cases) along with a DAMA (Demand Assigned Multiple Access) satellite access scheme, which enables providing a service for a large number of users over relatively small bandwidth.

However, a VSAT network in star topology fails to meet several key requirements of the small-scale network topology previously presented. In one aspect, the bandwidth utilization efficiency expected from DAMA access schemes may be achieved only with a relatively large install base (hundreds of sites). Most SME networks may comprise only a tenth of that number of sites or even less than that. In another aspect, the star topology is efficient where almost all traffic is exchanged between the remote terminals and the data center via the hub and almost no traffic is exchanged between remote sites (e.g. branches or a second data center). Any data exchanged between VSATs travels twice via the satellite (in double hop) hence requiring approximately twice the satellite bandwidth compared to data exchanged with a data center at the hub. Since in the small-scale network topology previously presented a considerable portion of the total traffic may be exchanged between remote sites (especially between branches and their headquarters), a star topology network may be much less efficient than usually expected for such networks. In yet another aspect, any data exchanged between two VSATs is subjected to longer latency due to the additional satellite hop in each direction, hence user experience (e.g. for voice and video sessions) might be significantly compromised. In a further aspect, installing a hub for a satellite network at an SME's data center may require SME personal to operate the satellite network hence the operational simplicity requirement presented above is not satisfied as well.

In another variant of a VSAT network in star topology, a small hub may be located at each HQ of the enterprise and connectivity to the HO may be provided from each HQ via a single channel per carrier (SCPC) link. While offering efficient connectivity between branches and their HQ, the connectivity between branches and the connectivity to the Internet via the HO is in two satellite hops per direction, hence the problems of latency and user experience are not resolved but rather relocated from one link to another. In addition, the issues of bandwidth efficiency (due to network size) and operation simplicity were already presented above and are applicable in the same way to this type of solution as well.

Consequently a VSAT network in star topology, where the hub is located either at the HO or at the HQ, is an inadequate solution for a small-scale network topology as previously presented.

Figure 8B:
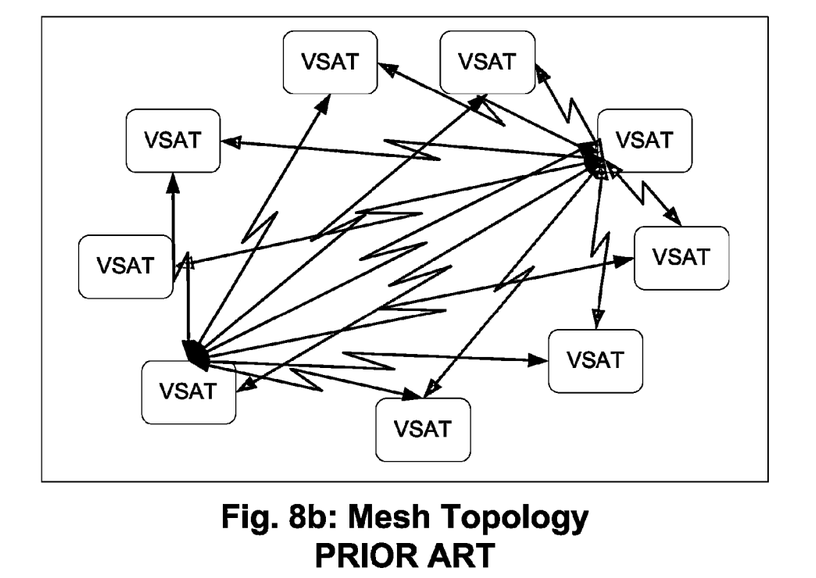

Another solution known in the art may be a fully meshed VSAT network, for example as illustrated in FIG. 8b. In certain networks, this topology may provide certain advantages over a star topology network, such as more efficient exchange of data between VSATs (in single satellite hop) and better user experience (lower latency). In some embodiments, as shown in FIG. 8b, a mesh network may be configured without a hub. However, such embodiments often use static channel assignments hence the total bandwidth efficiency is limited (i.e. network operation costs are higher) and the task of managing the network (e.g. adding additional sites) may be more complicated (i.e. network operation might not be simple).

However, a VSAT network in fully meshed topology fails to meet several key requirement of the small-scale network topology previously presented. In one aspect, mesh links are usually point to point links. In a topology where a VSAT may be configured to support a data center or an HQ of an SME, that VSAT may be required to concurrently maintain multiple point-to-point mesh links with plurality of other VSATs, both for transmission and reception. Since each remote terminal may be configured to have a single receiver and a single transmitter, the satellite links must be designed for aggregating the total traffic of all point-to-point links used concurrently between the data center and the other sites. This means that all VSATs in the network may be configured to transmit and receive at relatively high rate, though the throughput for each VSAT may be much lower. Achieving high throughput between remote sites (e.g. due to the above or due to broadband requirements or for video conferencing) requires a larger (and more expensive) VSAT antenna and a more powerful (and expensive) transmission equipment at each site in order to insure a sufficient link budget between any two VSATs. Consequently, the entire solution may be cost ineffective and/or face regulatory obstacles due to high transmission power. In other aspects, issues such as bandwidth efficiency (due to network size) and operation simplicity (assuming the network has a hub) were already presented above in context with the star topology network and are applicable in a similar way to this type of solution.

Consequently a VSAT network in fully meshed topology is an inadequate solution for a small-scale network topology as previously presented.

Figure 8C:
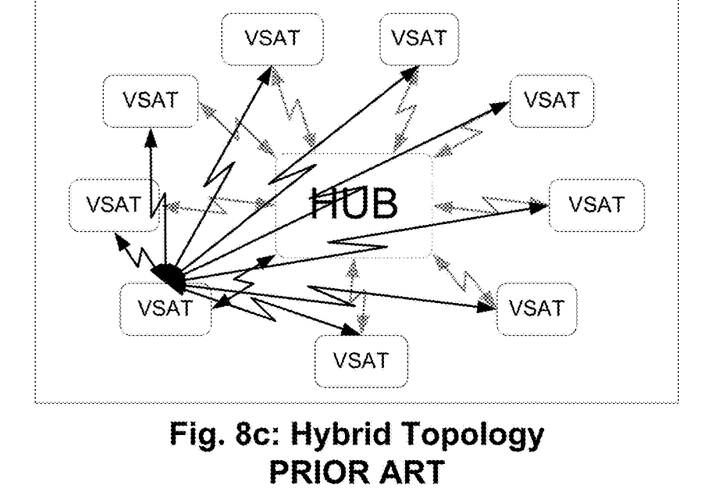

Yet another solution known in the art may be a VSAT network in a hybrid star and mesh topology, for example as illustrated in FIG. 8c, comprising a hub and plurality of remote terminals (VSATs), at least some of them configured for mesh connectivity as well as connectivity with the hub (e.g. through comprising a second inbound receiver as well as a first outbound receiver). In certain networks, a hybrid star and mesh topology may enable more efficient and lower latency connectivity between remote terminals compared to star topology.

However, a VSAT network in hybrid topology fails to meet several key requirement of the small-scale network topology previously presented. In one aspect, the issues of bandwidth efficiency (due to network size) and operation simplicity previously presented for the star topology are applicable in the same way to this type of solution. In another aspect, since the network is basically a star network and the VSATs comprise relatively small antennas and low power transmission equipment, mesh connectivity may be supported only for low throughput applications. Hence a hybrid topology may be used where the traffic between remote terminals consists for example of low-rate data transfer and/or a telephony application (which have low-rate traffic requirements), as the link rate is limited by the antenna sizes from both ends. Therefore, a hybrid topology may be inadequate for supporting a second data center at a location other than the hub, which is a key requirement in the small-scale network topology previously presented. In yet another aspect, any attempt to increase the throughput over mesh connectivity may require a larger VSAT antenna and/or a more powerful (and expensive) transmission equipment at least at one end of the mesh link. This may introduce the deficiencies of the fully meshed network, as previously presented, back into this topology.

Consequently a VSAT network in a hybrid star and mesh topology is an inadequate solution for a small-scale network topology as previously presented.

Figure 8D:
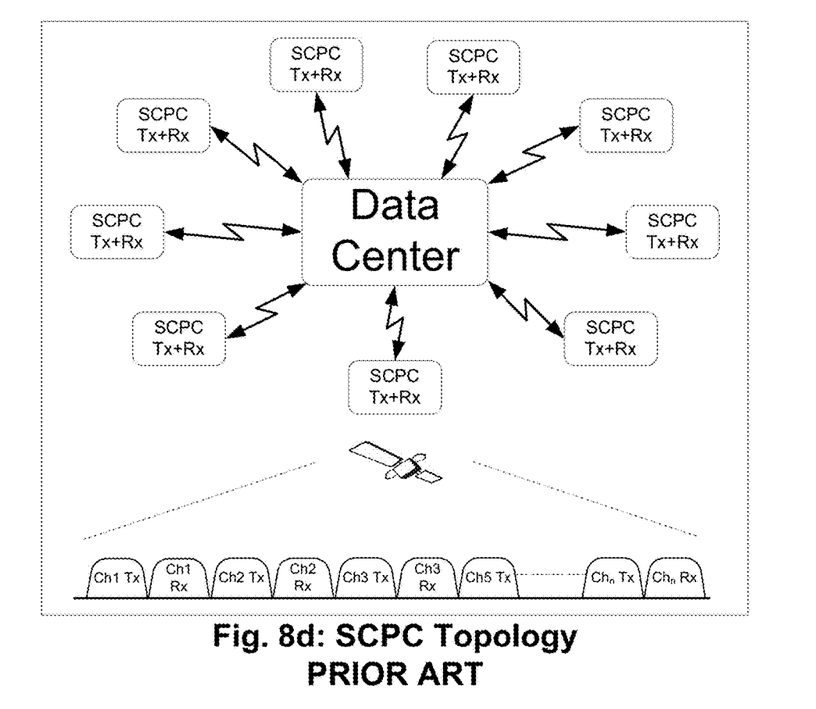

Another approach known in the art toward satellite communication networks is based on a single channel per carrier (SCPC) topology. In this approach, for example as illustrated in FIG. 8d, each link between a remote terminal and a data center requires a separate channel over a fully dedicated carrier. Those links might not be shared or multiplexed hence require permanent satellite resources, as also illustrated in FIG. 8d.

An SCPC approach fails to meet several key requirement of the small-scale network topology previously presented. In one aspect, perhaps some of the biggest disadvantages of this approach are its inherent bandwidth inefficiency while working with non-continuous traffic (e.g. as in the case of IP networks) and its rigidness and inflexibility from satellite resources point of view. In another aspect, in a network containing more than very few sites, perhaps with one site being configured as a data center to which all the other sites may be connected and with requirements for single hop connectivity between at least some of the other sites, the necessary equipment required for implementation of such a network may be cost-ineffective, as a dedicated transceiver (transmitter and receiver) may be required for each link.

Over the years, several enhancements to the SCPC approach were introduced such as the MCPC (Multiple Channels Per Carrier) approach. Although an MCPC approach may enable time division multiplexing (TDM) of several data streams over a single carrier, this approach does not cure any of the other deficiencies previously presented with respect to the SCPC approach.

Consequently the SCPC approach is an inadequate solution for a small-scale network topology as previously presented.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

The invention described herein is an innovative approach towards satellite network topology.

In some aspects of the invention, a single, large-scale satellite access communication network may be configured as infrastructure for many small-scale subnets, wherein each subnet may be configured to serve a different organization (e.g. an SME) as a private network. Each subnet may be configured as a private small star and/or mesh satellite data access network from the end-user perspective, yet all subnets may be configured to be part of the total large-scale network and share satellite bandwidth resources without compromising their privacy. Such configuration may yield significantly higher bandwidth efficiency, lower operation and equipment costs, minimized latency and ease of network operations for each of the small organizations sharing the large-scale network.

In another aspect of this invention, a gateway included in a subnet may transmit data to remote terminals included as well in a subnet, using a channel comprised of long bursts overlaying two or more consecutive timeslots on a transmission channel, which may be shared by other remote terminals on a timeslot-by-timeslot basis. Furthermore, said gateway may be configured to manage said channel as a point-to-multipoint stream and statistically multiplex data destined to one or more remote terminals over said channel.

In yet another aspect of this invention, a gateway included in a subnet may be configured to simultaneously receive multiple bursts from remote terminals included in a subnet through use of multiple tunable receivers. Also presented is a method for said receivers for distributing allocations between the receivers.

BRIEF DESCRIPTION OF THE DRAWINGS

Having thus described the invention in general terms, reference will now be made to the accompanying drawings, which are not necessarily drawn to scale, and wherein:

FIGS. 8a-8d illustrate topologies of prior art systems in the field to which this invention pertains to.

DETAILED DESCRIPTION

Figure 2:
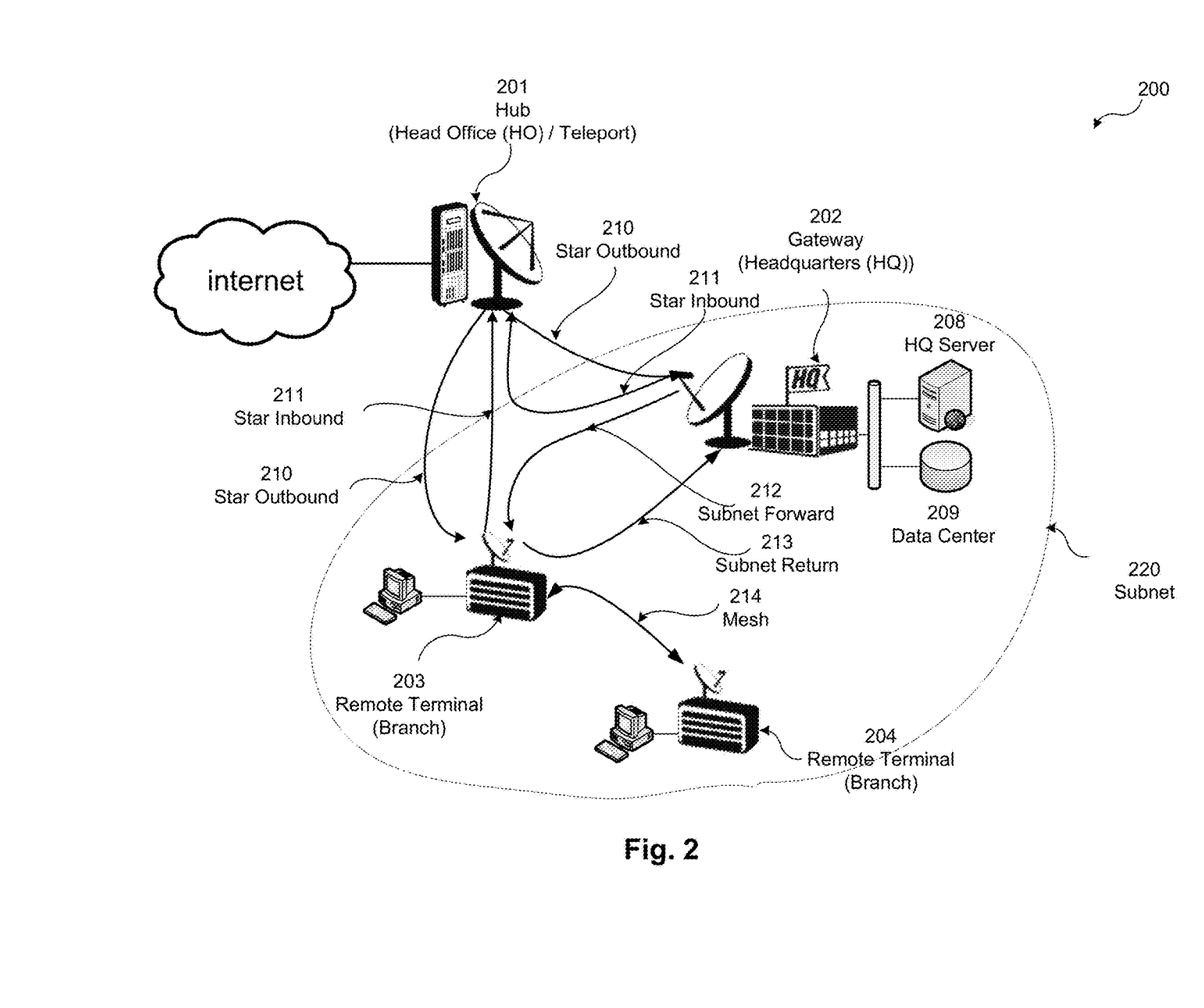
FIG. 2 illustrates a satellite access communication network in accordance with some aspects of this invention.

FIG. 2 illustrates a satellite access communication network 200 in accordance with some aspects of this invention. Satellite communication network may comprise a hub 201, a Gateway 202 and plurality of remote terminals (e.g. VSATs), such as remote terminals 203 and 204. Hub 201 may be located at a corporate head office (HO) or at a satellite communication teleport, where expertise that may be required for operating a satellite communication network and terrestrial connectivity to a wide area network, such as the Internet, may be available. Gateway 202 may be located at a headquarters (HQ) or at a data center of a small organization (e.g. and SME). Remote terminals, such as remote terminals 203 and 204, may be located at branches of the same organization, at the headquarters of which Gateway 202 may be located. Gateway 202 and remote terminals 203 and 204 may be configured to form a subnet 220 as further discussed herein.

Hub 201 may be configured to include means for transmitting a forward channel corresponding to star outbound channel 210, and for receiving transmissions of remote terminals and Gateways over return channels corresponding to star inbound channel 211. Hub 201 may be further configured to include any of one or more satellite access processors, for at least the purpose of allocating satellite bandwidth resources to Gateway 202 and remote terminals 203 and 204, one or more data processors, for at least the purpose of processing data and optimizing traffic over the satellite link, quality of service (QoS) enforcers, means to connect to one or more wide area networks, or any other facilities necessary for operating satellite access network 200. Hub 201 may also be configured to include a network management system, for at least any of the purposes of managing the network components (e.g. the hub itself, Gateway 202 and remote terminals 203 and 204), managing and authenticating users or monitoring network performance.

Furthermore, satellite access network 200 may be configured as a DAMA network. In some embodiments, network 200 may be configured to employ a reservation-based DAMA access scheme (for example based on DVB-RCS recommendations). Hub 201 may be configured to distribute a return channel time-frequency plan to remote terminals and Gateways over star outbound channel 210, which all remote terminals and Gateways may be configured to receive, as shown in FIG. 2. Remote terminals and Gateways may be configured to receive a time-frequency plan over star outbound channel 210 and to transmit bandwidth requests to hub 201 over a control channel included in star inbound channel 211. Hub 201 may be further configured to receive bandwidth requests and in response to receiving such requests to allocate bandwidth in accordance with the distributed time-frequency plan over any of star inbound channel 211, subnet forward channel 212, subnet return channel 213, or mesh channel 214. Hub 201 may be further configured to transmit information regarding said allocations over star outbound channel 210 to the requesting remote terminals and Gateways. Remote terminals and Gateways may be further configured to receive allocation information from hub 201 over star outbound channel 210 and then to transmit on any of a star inbound channel 211, a subnet forward channel 212, a subnet return channel 213 or a mesh channel 214, in accordance with the received allocation information and the distributed time-frequency plan. It may be appreciated by one skilled in the art that the reservation-based access scheme described above is only an example for a DAMA access scheme and that the invention described herein may be embodied in conjunction with any type of DAMA access scheme which satellite access network 200 may be configured to employ.

Furthermore, hub 201 may be configured to transmit user data and network management information towards Gateway 202 and remote terminals 203 and 204 over star outbound channel 210 and receive data and control information from Gateway 202 and remote terminals 203 and 204 over star inbound channel 211. The network management traffic may include, for example, software files (e.g. for remote terminals and Gateways), synchronization information (e.g. timestamps), authentication and authorization information, monitoring and commands, and any other type of information, which may be required for the management of network 200.

Gateway 202 and remote terminals 203 and 204 may be configured to communicate with hub 201 for at least the purposes of providing access to a WAN (e.g. the Internet) and for exchanging network control information. Gateway 202 and remote terminals 203 and 204 may be configured to receive data and control information from hub 201 over star outbound channel 210 and transmit data and control information to hub 201 over star inbound channel 211.

Gateway 202 and remote terminals 203 and 204 may be further configured to directly communicate for at least the purpose of exchanging data. Gateway 202 may be configured to transmit data towards remote terminals 203 and 204 over subnet forward channel 212 and to receive data from remote terminals 203 and 204 over subnet return channel 213. Remote terminals 203 and 204 may be configured to transmit data towards Gateway 202 over subnet return channel 213 and to receive data from Gateway 202 over subnet forward channel 212. Furthermore, remote terminals 203 and 204 may be further configured to directly communicate over mesh channel 214, i.e. to send and receive data over mesh channel 214, for example in order to support a phone call or a direct exchange of data.

Figure 3:
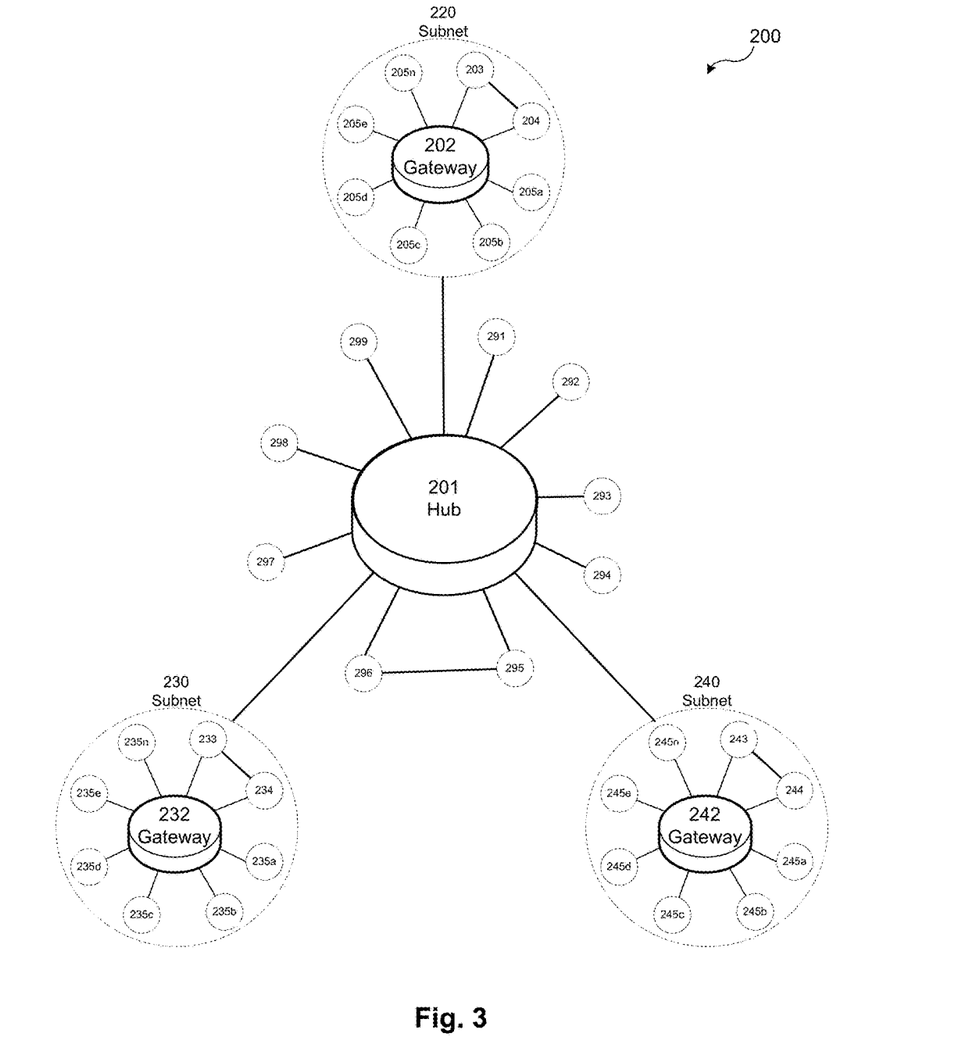
FIG. 3 shows an illustrative hierarchical view of a satellite access communication network in accordance with some aspects of this invention.

FIG. 3 shows an exemplary hierarchical view of network 200, a portion of it may be illustrated in FIG. 2. Satellite access network 200 may comprise a plurality of subnets similar to subnet 220, such as subnets 230 and 240. Each subnet may comprise a Gateway similar to Gateway 202, such as Gateways 232 and 242 of subnets 230 and 240 correspondingly. Each subnet may further comprise remote terminals similar to remote terminals 203 and 204, such as additional remote terminals 205a to 205n of subnet 220, remote terminals 233, 234 and 235a to 235n of subnet 230, and remote terminals 243, 244 and 245a to 245n of subnet 240. Gateways 232 and 242, and remote terminals 233 to 235n and 243 to 245n, may be configured to correspondingly communicate in a manner similar to the manner described in reference to FIG. 2, Gateway 202 and remote terminals 203 and 204, at least for the purpose of forming subnets 230 and 240.

Furthermore in reference to FIG. 3, satellite access network 200 may be further configured to include independent remote terminals, such as remote terminals 291 to 299, which may belong to no subnet and communicate with the hub and with one another (either in mesh topology or in double hop). In some embodiments of network 200, communication between independent remote terminals, such as remote terminals 291 to 299 (e.g., remote terminals 295-296), and remote terminals belonging to subnets (e.g., remote terminals 203-204, 233-234, or 243-244) may also be possible (either in mesh topology or in double hop).

In one aspect of this invention and still in reference to FIG. 2 and FIG. 3, satellite access communication network 200 may be configured as a large-scale network, comprising in total a sufficient number of remote terminals (and Gateways), for at least the purpose of efficiently utilizing any return link bandwidth through use of a DAMA access scheme. In addition, since network 200 may be a large-scale network and since all management traffic to all remote terminals is transmitted over a single star outbound channel 210, less bandwidth may be required for management traffic on a per remote terminal basis compared to a scenario of a several stand-alone small-scale networks. Though network 200 may be configured with multiple star outbound channels, it should be appreciated by anyone skilled in the art that use of a single star outbound channel may be more efficient than use of multiple star outbound channels.

Figure 4:
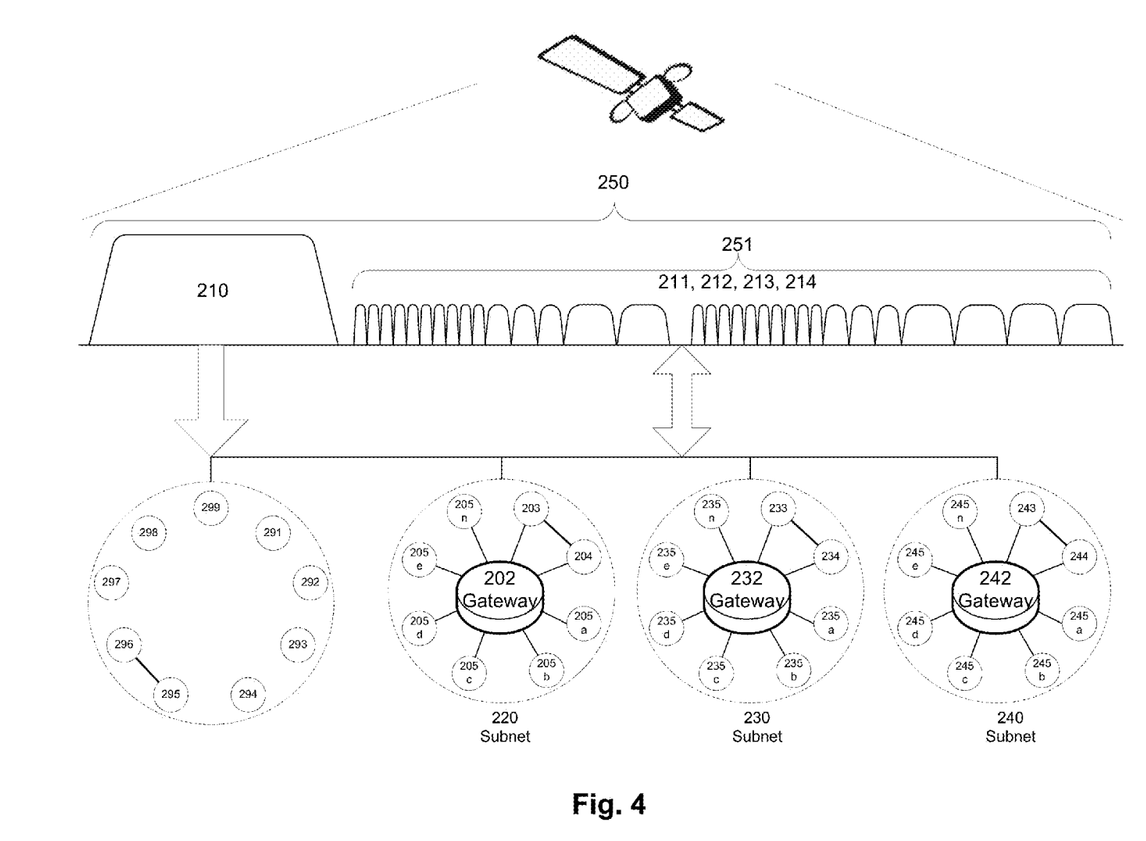
FIG. 4 shows an illustrative space segment arrangement corresponding to a satellite access communication network in accordance with some aspects of this invention.

FIG. 4 shows an exemplary arrangement of a space segment 250, which may correspond to satellite access communication network 200 of FIG. 2 and FIG. 3. As previously described, the number of remote terminals, which may be part of each subnet, such as subnets 220, 230 and 240, and/or the number of independent remote terminals 291 to 299, may be too small for DAMA statistics to be effective and for efficiently utilizing satellite bandwidth. Satellite access communication network 200 may be configured for any of the channels used by remote terminals and Gateways, such as star inbound channels (e.g. 211), subnet forward channels (e.g. 212), subnet return channels (e.g. 213) and/or mesh channels (e.g. 214), to be multiplexed over one or more pools of bandwidth or share one or more pools of bandwidth included in total return link 251 bandwidth. Such multiplexing or sharing may result in the number of remote terminals per bandwidth pool being large enough for at least the purpose of enabling an efficient use of a DAMA access scheme over said one or more bandwidth pools. In some embodiments, all channels used for transmission by remote terminals and Gateways may share a common pool of bandwidth. In other embodiments, some of the said channels, for example on a channel type basis or on a subnet basis or both, may be located on dedicated bandwidth, for example due to extreme differences in spectral density between different channel types.

In another aspect of this invention, Gateway 202 may be configured to transmit and remote terminals 203 and 204 may be configured to receive a subnet forward channel 212 comprised of long bursts overlaying two or more consecutive timeslots on a transmission channel, which may be included in a time-frequency plan, which hub 201 may be configured to distribute to all remote terminals as previously described. In some embodiments, hub 201 may be configured to allocate bandwidth for a subnet forward channel 212 over a distributed time-frequency plan using said long bursts. Furthermore, Gateway 202 may be configured to manage forward channel 212 as a point-to-multipoint stream or connection, and statistically multiplex data destined to one or more remote terminals (e.g. 203 and 204) over a subnet forward channel 212.

Figure 5A:
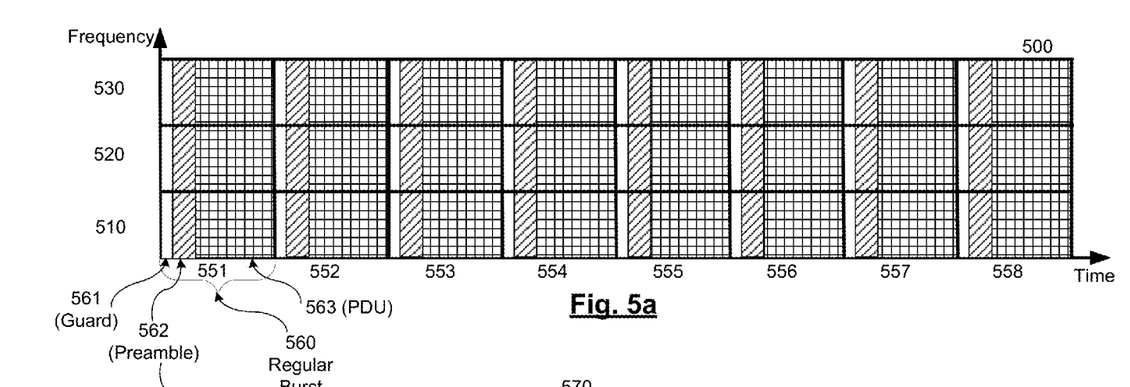
FIGS. 5a-5c show an illustrative time-frequency plan and an illustrative format of a transmission long burst in accordance with some aspects of this invention.

FIG. 5a shows an exemplary time-frequency plan 500, which satellite access communication network 200 may be configured to employ as previously described. Time-frequency plan 500 may be configured to include one or more transmission channels, such as channels 510, 520 and 530. Each transmission channel may be further comprised of transmission timeslots, such as timeslots 551 to 558. Each timeslot may be used for transmission of a single burst, such as timeslot 551 on channel 510 which may be allocated for transmitting burst 560. Burst 560 may be comprised of a guard period 561, a preamble 562 and a payload data unit (PDU) 563. Guard period 561 and preamble 562 may be used for burst synchronization at the physical layer and therefore may contain no data. Hence the data, which a remote terminal or a Gateway may transmit, may be included in PDU 563. The data included in PDU 563 may be coded using a forward error correction (FEC) code, for example in accordance to a pre-defined coding ratio (the coding ratio may specify the number of un-coded data bits relative to the total number of bits transmitted, e.g. a coding rate of ¾ means that out of every 4 transmitted bits 3 are data bits and one bit may include error correction information). Consequently, some of the transmitted bits may contain error correction information rather than actual data, at least for the purpose of reducing end-to-end error rate (e.g. by increasing the probability for correct decoding of the data at a receiver). Therefore, the utilization efficiency of burst 560 may depend on a coding ratio used in PDU 563 and the durations of guard 561 and preamble 562 compared to the total duration of burst 560. Since the guard and the preamble might not be reducible due to physical limitations, a weaker coding rate having less correction bits (i.e. higher coding ratio) may be used. However, use of a weaker coding rate may require transmitting at higher power level (e.g. $E_S/N_0$) in order to maintain a desired error probability.

As previously described in reference to FIG. 2, Gateway 202 may be configured to transmit a subnet forward channel 212 towards a plurality of remote terminal within subnet 220 (e.g. 203 and 204). In some embodiments, Gateway 202 may be configured to transmit only a single burst at any point in time. Therefore, Gateway 202 may be configured to transmit at a relatively high rate, for at least the purpose of transmitting the aggregated traffic destined to the plurality of remote terminals included in subnet 220. However, the higher the transmission rate required, the more expensive the equipment required both at Gateway 202 and at remote terminals 203 and 204 and network operational may become, as larger antennas at both ends and/or a more powerful transmission amplifiers at Gateway 202 may be needed and the more expensive the space segment may become due to increased power requirements.

Figure 5B:
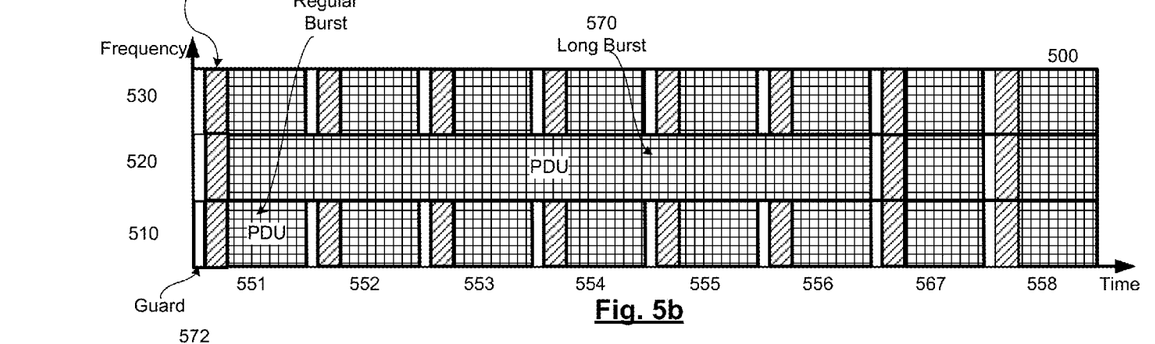

FIG. 5b shows time-frequency plan 500 of FIG. 5a, including an allocation of timeslots 551 to 556 on channel 520 for transmission of long burst 570. Hub 201 may be configured to cascade two or more consecutive timeslots on a transmission channel (e.g. channel 520) to form long burst 570 upon allocating bandwidth to Gateway 202 for transmitting information towards remote terminals included in subnet 220 over subnet forward channel 212. A transmission channel may be allocated at one time as a long burst and immediately thereafter as regular bursts, as per the discretion of hub 201.

Subnet forward channel 212 may be comprised of long bursts, such as long burst 570, for at least the purposes of increasing transmission efficiency and therefore reducing the costs of equipment and operation as previously described. As long burst 570 may be allocated over the same time-frequency plan 500 like regular bursts, subnet forward channel 212 may be configured to share a bandwidth pool with any of the other channel types (e.g. star inbound channel 211, subnet return channel 213 and mesh channel 214) for at least the purpose of more efficiently using the entire bandwidth of return link 251.

Long burst 570 may span over multiple timeslots (K), wherein each timeslot may be used at another time for transmitting a regular burst, such as burst 560. However, each of these K regular bursts may have a guard period 561 and a preamble period 562, while long burst 570 has only a single guard period 571 and a single preamble period 572, which may be similar in duration to guard 561 and preamble 562 correspondingly. Therefore long burst 570 may be more efficient than burst 560, as the ratio of guard and preamble periods out of the total burst duration is 1/K in comparison to burst 560. In other words, over the same period of time there may be more coded data in long burst 570 than in K bursts such as burst 560.

In addition, burst 560 may include a relatively short PDU (e.g. hundreds to several thousands of bits). FEC codes performance may be higher as PDU size becomes longer. Given a coding rate, in order to maintain a similar end-to-end error probability, long burst 570 may require less transmission power (e.g. $E_S/N_0$) than burst 560. Alternatively, given similar transmission power (e.g. $E_S/N_0$), long burst 570 may be configured with a weaker and more efficient coding rate than burst 560 and maintain a similar end-to-end error probability. Therefore the cost of equipment and the cost of operations may be more cost-effectively balanced using a long burst.

However, while longer bursts may be more efficient at the physical level, this additional efficiency may be lost if the fill factor is low, i.e., if the bursts are only partially filled with data (e.g., and the rest is just padding). In order to achieve a high fill factor, Gateway 202 may be configured to manage forward channel 212 as a point-to-multipoint stream and to statistically multiplex data destined to one or more remote terminals (e.g. 203 and 204) over subnet forward channel 212. Furthermore, Gateway 202 may exercise such multiplexing within the scope of a long burst.

Figure 5C:
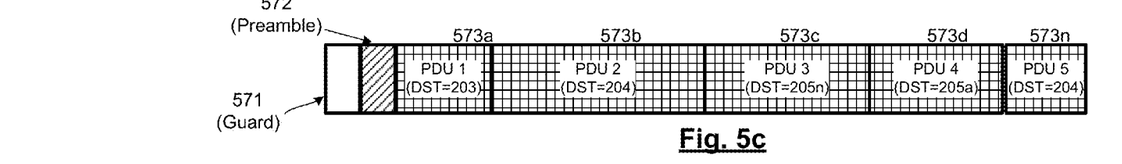

FIG. 5c shows a possible format of long burst 570, including a guard period 571, a preamble 572 and a plurality of PDUs 573a to 573n, wherein each PDU may be destined to a remote terminal included in subnet 220 and the plurality of PDUs may be destined to one or more remote terminals included in subnet 220. For example, PDU 573a may be destined to remote terminal 203 while PDUs 573b and 573n may be destined to remote terminal 204. Gateway 202 may be configured to multiplex a plurality of PDUs into long burst 570, wherein each PDU may include a header containing at least an information item usable for at least the purpose of identifying a remote terminal for which the PDU is destined, and to transmit long burst 570 over subnet forward channel 212. A remote terminal included in subnet 220 may be configured to receive long burst 570 from subnet forward channel 212, determine the destination of each PDU included in the received long burst using said header, filter in only those PDUs which may be destined to it and discard all other PDUs included in long burst 570.

In yet another aspect of this invention, Gateway 202 may be configured to simultaneously receive multiple bursts, such as burst 560, over subnet return channel 213, which remote terminals included in subnet 220 (such as remote terminals 203 and 204) may be configured to transmit. Gateway 202 may be further configured to receive an aggregated high data throughput over multiple transmission channels included in subnet return channel 213, while remote terminals included in subnet 220 (such as remote terminals 203 and 204) may be configured to transmit on subnet return channel 213 at a relatively low rate (e.g. using low rate transmission channels), for at least the purpose of using a lower cost transmitter.

Figure 6:
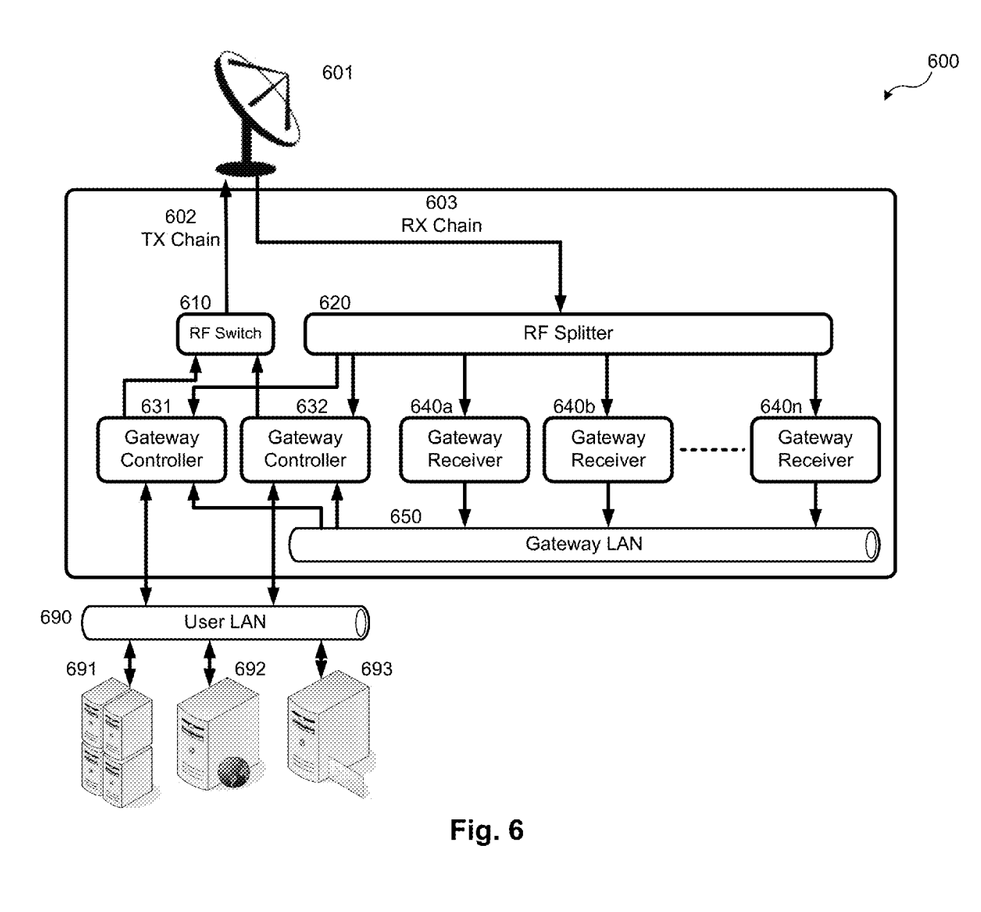
FIG. 6 shows an illustrative architecture of a Gateway in accordance with some aspects of this invention.

FIG. 6 illustrates an exemplary architecture of a Gateway 600, which may be similar to Gateway 202 of FIG. 2. Gateway 600 may comprise an antenna 601, a transmission chain 602 coupled with antenna 601, which may further comprise a transmission amplifier (not shown) or a block up converter corresponding to a satellite frequency range, a reception chain 603 coupled with antenna 601, which may further comprise a reception low noise block (LNB, not shown) corresponding to a satellite frequency range, and an RF Splitter 620, which may be coupled to reception chain 603. Gateway 600 may further comprise at least one Gateway Controller (GC) 631 coupled with transmission chain 602 and RF Splitter 620, for at least the purposes of transmitting any of a star inbound channel (e.g. 211), a subnet forward channel (e.g. 212) or possibly a mesh channel (e.g. 214) via transmission chain 602, and receiving a star outbound channel (e.g. 210) via reception chain 603 and RF Splitter 620. Gateway 600 may be further configured to couple a GC to end-user servers and equipment via user LAN 690. For example, Gateway 600 may be coupled with a data center 691, a web server 692, a mail server 693 or to any other applicable equipment and application.

Since a Gateway may be located at a relatively central site and aggregate traffic from a plurality of remote terminals, any malfunction in Gateway 600 may affect multiple end-users. Therefore, in some embodiments (e.g., as shown in FIG. 6), Gateway 600 may alternatively comprise at least two Gateway Controllers 631 and 632 coupled to RF Switch 610, which in turn may be coupled to transmission chain 602, for at least the purpose of providing redundancy and a malfunction resilient configuration. GCs may be configured to operate in a standby mode (e.g., hot standby), wherein at any time only one GC may be configured as active while other GCs may be configured as backup or in standby and wherein a backup GC in standby may be configured to monitor an active GC (e.g. via Gateway LAN 650) and to become the active GC upon determining that the previously active GC malfunctioned. RF Switch 610 may be configured to connect a first active GC to transmission chain 602 at any given time and to maintain the selection, perhaps including through a power cycle, as long as said first GC properly functions or until explicitly instructed to connect another GC to transmission chain 602.

In addition, Gateway 600 may further comprise one or more Gateway Receivers (GR) 640a to 640n, which may be coupled to the RF Splitter 620 and to an active GC (e.g. GC 631) via Gateway LAN 650. Gateway Receivers 640 may be configured to receive and decode bursts, for example such as burst 560 of FIG. 5, which remote terminals may be configured to transmit at least over a subnet return channel (e.g. 213), and to send received data included in said bursts to a GC via LAN 650. Furthermore, GR 640 may be configured to simultaneously receive at least one burst included in a tunable transmission channel. GR 640 may be further configured to tune on a second transmission channel for receiving a second burst, wherein both first and second bursts may be properly received as long as the end of the first burst does not overlap in time the beginning of the second burst (i.e. fast hopping). GR 640 may be further configured to receive a first and a second burst wherein the second burst differs from the first burst in any one or more characteristics of frequency, symbol rate, modulation or FEC coding. Therefore, the number of bursts Gateway 600 may simultaneously receive over a subnet return channel (e.g. 213) may correspond to the number of Gateway Receivers 640, which Gateway 600 may comprise.

An active GC, such as GC 631, may be configured to control the entire operation of Gateway 600. GC 631 may be configured to receive traffic from end-user applications, to process the data in accordance with applicable algorithms and to transmit the processed data to another component in network 200 over the satellite, e.g. to hub 201 over star inbound channel 211 or to another remote terminal, for example over a subnet forward channel 212. GC 631 may be further configured to receive traffic either from hub 201 over star outbound channel 210 or from other remote terminals via GRs 640, for example over subnet return channel 213, to process the received data in accordance with applicable algorithms and to forward the processed data to end-user applications. GC 631 may be further configured to control GRs 640, wherein said control may include at least any of providing a network address (for example an IP address using DHCP), an operational software or parameters for obtaining an operational software (for example from a stream which may be transmitted over star outbound channel 210), and information regarding at least one session or connection with a remote terminal, for which reception of data transmitted over subnet return channel 213 may be required.

Furthermore, a Gateway Receiver 640 may be configured to include a second receiver, for at least the purpose of receiving a star outbound channel (e.g. 210). GR 640 may be further configured upon initialization to acquire a network address (e.g. an IP address using DHCP) from a GC, to receive a stream identifier from a GC and to download operational software from said star outbound channel (e.g. 210) using said second receiver. GR 640 may be further configured to extract from said star outbound channel (e.g. 210) at least synchronization information, time-frequency plan information and allocation information corresponding to at least one connection or session of interest in accordance with control information that may be received from a GC.

In addition, a GR 640 may be further configured to determine the number of GRs coupled to a GC and its own index within said group of GRs, wherein each GR may be configured to determine a unique index (for example based on a network address or any other information received from a GC upon initialization, as previously described). A GR 640 may be yet further configured to receive allocation information and use time-frequency plan information previously obtained as previously described, and independently determine which allocations to attend and which to leave for other GRs, which may be included in said group of GRs.

Figure 7:
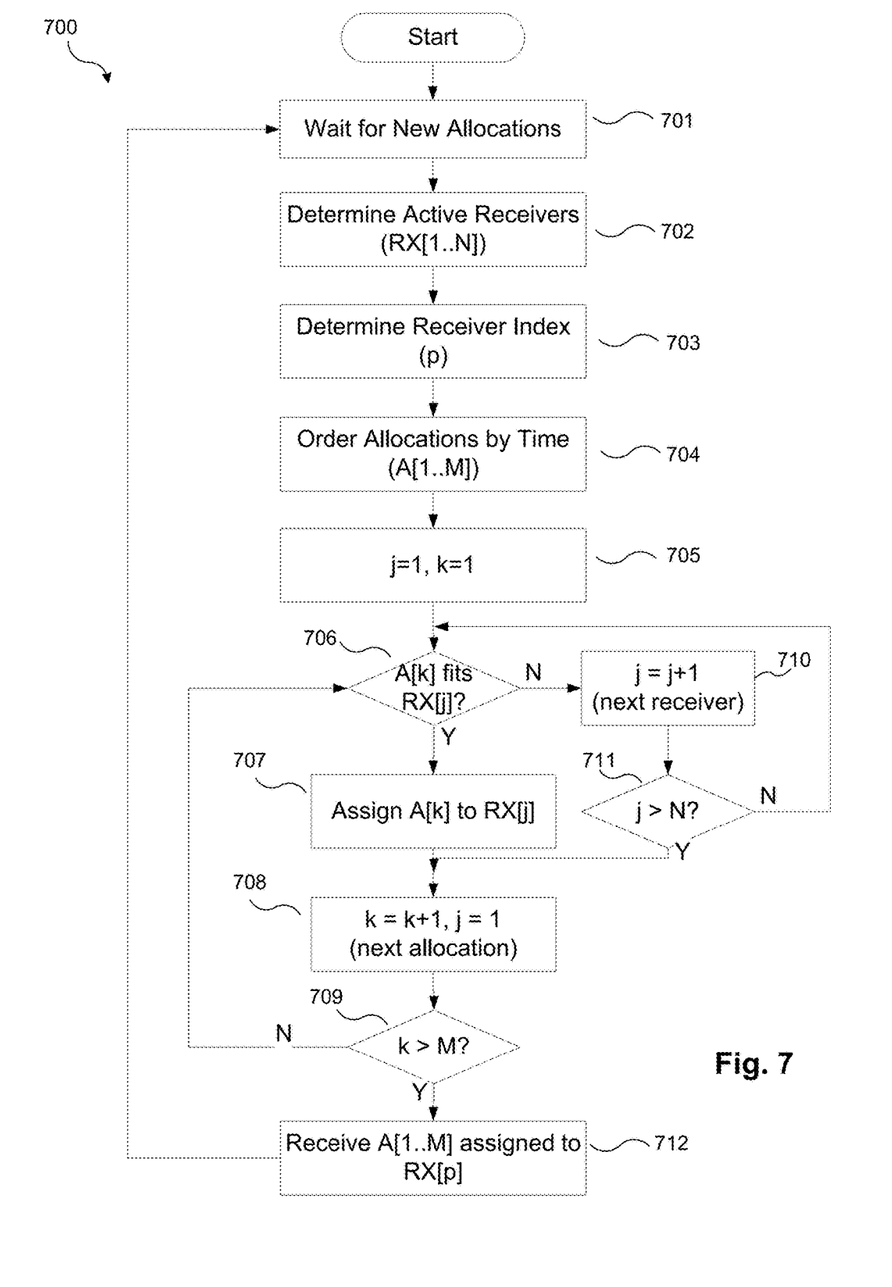
FIG. 7 shows a flowchart describing an algorithm for a Gateway Receiver in accordance with some aspects of this invention.

FIG. 7 shows a flowchart describing algorithm 700 for a GR, for at least the purpose of determining which allocations to attend, as described above. Each GR 640 included in Gateway 600 may be configured to perform algorithm 700, for at least the purpose of determining which allocations to attend. GR 640 may be further configured to start performing algorithm 700 immediately following initialization and to perform said algorithm for as long as GR 640 may be operational.

In step 701, GR 640 may be configured to wait for new allocations. GR 640 may be configured to examine allocation information, which it may be configured to receive as previously described, and to determine whether at least one allocation included in said allocation information corresponds to at least one connection or session between Gateway 600 and at least one remote terminal. GR 640 may be configured to start performing step 702 upon determining that at least one such allocation is included in received allocation information.

In steps 702, GR 640 may be configured to determine the number of GRs currently active (N). In step 703, GR 640 may be configured to determine its unique index (p, where $1 \leq p \leq N$) within said group of active GRs. Steps 702 and 703 may be repeated each time new allocations may be received for at least the purpose of immediately responding to any change in number of active GRs, for example due to a malfunction in any one or more GRs or due to one or more GRs regaining operational status, and distributing said allocations between the remaining GRs.

In step 704, GR 640 may be configured to chronologically order the received allocations in an ascending order, for example in accordance to a start time characteristic of each allocation. GR 640 may be further configured to refer to the ordered allocations using a vector (A[1 ... M]). In step 705, GR 640 may initialize two indexes, for example the index j for a GRs vector (RX[1 ... N]) and the index k for the allocations vector (A[1 ... M]).

Steps 706 to 711 may be configured as a loop, for at least the purpose of assigning each allocation to a GR within said group of GRs (RX[1 ... N]). In step 706, GR 640 may be configured to determine whether a first allocation (A[k]) fits a first GR (RX[j]), for example if said first allocation can be assigned to said first GR without overlapping at least one other allocation already assigned to said first GR (e.g. during a previous pass of the loop). In step 707, GR 640 may be configured to assign said first allocation to said first GR if said first allocation fits said first GR. For example, GR 640 may be configured to record the current value of index j in the vector of allocations (A[1 ... M]) at the entry corresponding to an allocation which may be pointed to by the index k (A[k]). In steps 708 and 709 GR 640 may be configured to increment the allocations index, to reset the receiver index and to determine whether there is at least one more allocation to assign. GR 640 may be configured to terminate the loop and proceed to step 712 if all allocations are assigned, or to make another pass in the loop (i.e. proceed to step 706) if there is at least one more allocation to assign.

However, if in step 706, GR 640 may determine that a first allocation (A[k]) does not fit a first GR (RX[j]), for example, since said first allocation overlaps at least one other allocation already assigned to said first GR. In step 710 and 711 GR 640 may be configured to increase the GRs vector index (j) and to determine whether there is at least one more active GR, which may be assigned said first allocation. GR 640 may be configured to make another pass in the loop (i.e. proceed to step 706) and determine if said first allocation fits a second GR, if at least one more active GR exists. GR 640 may be configured to drop said first allocation (i.e. not assign it to any GR) and to proceed for assigning a second allocation (i.e. proceed to step 708) if determining in step 711 that no additional active GR may be available.

In step 712, GR 640 may be configured to determine the allocations it may attend. GR 640 may be configured to select all entries in the vector of allocations (A[1 ... M]), which may be assigned to its index (p). GR 640 may be further configured to repeat step 701 and wait for yet new allocations, as previously described. Since all GRs belonging to said group of GRs may perform algorithm 700 based on similar allocation information, and each GR in said group of GRs have a unique index in said group of GRs, each GR selects a different set of allocations and no allocation is left unattended, except maybe if the number of simultaneous allocations exceeds the number of GRs in said group of GRs.

In a further aspect of this invention and again in reference to satellite access communication network 200 of FIG. 2, FIG. 3 and FIG. 4, while subnets 220, 230 and 240 may be configured to share one or more bandwidth pools, subnets 220, 230 and 240 may be further configured as one or more small-scale satellite access networks, at least form an end-user perspective. These one or more small-scale satellite networks may be private networks, wherein interconnectivity between them may be forbidden form the end-user perspective. Therefore subnets 220, 230 and 240 may be configured as separate entities for any of IP networking, quality of service, and/or any other applicable aspect of data networks. Such separation between subnets and/or between subnets and independent remote terminals, and communication privacy features may be achieved using several techniques.

In some embodiments, each subnet may be configured as a virtual LAN (VLAN), for example in accordance with the IEEE802.1q recommendations. Using VLANs may enable creation of virtually separated networking domains, wherein traffic from separated domains might not be mixed, for at least the purpose of providing complete privacy for each domain. With each subnet being configured as a separated VLAN (e.g. assigned one or more unique VLAN IDs within satellite access communication network 200), each subnet may become a separate domain or a closed virtually separated IP network, wherein interconnectivity between said subnets or separated IP networks might not be possible within the boundaries of satellite access communication network 200 (such connectivity may be made possible through specifically configured routers, which may be located in a WAN, which hub 201 may be configured to interface). Subnet traffic may be forwarded within satellite access communication network 200 with VLAN information (e.g. VLAN ID) attached to it, at least for the purpose of enabling a receiving component (e.g. hub 201, a Gateway or any remote terminal) to filter and separate traffic based on VLAN configuration.

In other embodiments, the desired separation may be achieved through using methods of virtual routing (VR). Virtual routing may be a method for multiple instances of IP routing machines, each may be configured in accordance with independent routing rules, to independently exist and simultaneously operate over common hardware or a shared medium (e.g. a satellite access network). Satellite access communication network 200 may be configured to use one or more VR methods for at least the purpose of simultaneously supporting a plurality of completely separated IP networks over shared resources, such as hub 201, space segment 250, etc.

Furthermore, as previously described, hub 201 may be configured to receive bandwidth requests from Gateways and remote terminals and in response to receiving such requests to allocate bandwidth in accordance with a time-frequency plan over any of star inbound channel 211, subnet forward channel 212, subnet return channel 213, or mesh channel 214. Said allocation of bandwidth may further comprise employing of one or more QoS algorithms for at least the purposes of allocating bandwidth to each subnet (e.g. 220), Gateway (e.g. 202), remote terminal or channel type in accordance with a predefined service level agreement (for example in terms of committed capacity and/or priority), and preventing bandwidth starvation of subnets, Gateways and remote terminals when bandwidth resources are highly utilized. Wherein satellite access communication network 200 includes independent remote terminals, e.g. 291 to 299, for at least the purposes of QoS as described above hub 201 may be configured to regard independent remote terminals as constituting a one or more virtual subnets, though said virtual subnets need not include Gateways and wherein said virtual subnets need not comprise subnet forward channels or subnet return channels.

Hub 201 may be configured to use said one or more QoS algorithms at predefined intervals (e.g. allocation periods) and to determine the amount of bandwidth (or capacity) that may be allocated against pending bandwidth requests (i.e. previously received from Gateways and remote terminals) during said predefined interval. Said determining may be based on any of an amount of bandwidth requested, an amount of bandwidth available for distribution, a priority level of the requesting Gateway or remote terminal, a priority level of a subnet and a Service Level Agreement (SLA) of a subnet (e.g. a committed information rate (CIR) and/or a maximal information rate (MIR)) to which a requesting Gateway or remote terminal may belong to. Furthermore, hub 210 may be configured to use said QoS algorithms either in a single pool mode or in a multiple pools mode.

In a single pool mode, all bandwidth requests, i.e. for star inbound channel (e.g. 211), subnet forward channels (e.g. 212), subnet return channels (e.g. 213) and mesh channels (e.g. 214), may be processed by a single instance of said QoS algorithms. In some embodiments, this mode of operation may be suitable wherein all transmission channels may be used for both the star inbound channel (e.g. 211) and any of the other channel types (e.g. 212, 213 and 214).

In a multiple pools mode, hub 201 may be configured to divide bandwidth requests into at least two groups. A first group may include bandwidth requests for transmitting traffic towards hub 201 over star inbound channel (e.g. 211). One or more other groups may include bandwidth requests for transmitting traffic between Gateways and remote terminals over any of the other channel types, i.e. subnet forward channels (e.g. 212), subnet return channels (e.g. 213) and mesh channels (e.g. 214). Each of the at least two groups may be processed by a different instance of said QoS algorithms. In some embodiments, this mode of operation may be used with a two groups configuration and may be suitable wherein one set of transmission channels may be used for the star inbound channel (e.g. 211) and another set of transmission channels may be used for any of the other channel types (e.g. 212, 213 and 214).

Furthermore, independently of the mode in which said QoS algorithms may be used, bandwidth requests may be processed by said QoS algorithms in at least two steps. In a first step, hub 201 may be configured to consider the bandwidth requests on a subnet level. Hub 201 may be configured to aggregate bandwidth requests of one or more Gateways and all remote terminals included in a subnet for at least the purpose of determining an aggregated subnet demand. In addition, hub 201 may determine a subnet SLA, for example based on a predefined configuration of satellite access communication network 200. In some embodiments, an SLA may comprise of at least a committed information rate (CIR) figure and a maximal information rate (MIR) figure. Hub 201 may be further configured to determine a subnet demand and a subnet SLA for each subnet included in satellite access communication network 200, to determine the total available bandwidth and to distribute bandwidth for each subnet in accordance with any of a predefined policy, a priority of a subnet, the SLA of a subnet and the subnet demand previously determined. In a second step, hub 201 may be configured to distribute the bandwidth allocated to each subnet between one or more Gateways and remote terminals included in said subnet in accordance to any of an amount of bandwidth requested by a Gateway or a remote terminal, an SLA of a Gateway or a remote terminal, and a priority level of a Gateway or remote terminal.

In yet a further aspect of this invention, satellite access communication network 200 may be configured to accelerate an application, wherein the application may generate traffic both between a remote terminal (e.g. 203) and hub 201 and between the remote terminal and a Gateway (e.g. 202).

Satellite access communication network 200 may be used for numerous applications, including but not limited to any of HTTP (e.g. for Internet or Intranet access), cellular backhauling, file transfer (e.g. using FTP), CITRIX, SAP, as well as end users' private and/or customized applications (for example web-based applications). Due to inherent satellite round trip latency, when used over satellite some applications, for example web browsing (HTTP) and TCP-based applications, may require use of acceleration techniques in order to exhibit satisfactory performance. However, these applications may be used both over a WAN, which may be accessible via hub 201, and over a corporate LAN, which may be accessible via a Gateway (e.g. 202), hence said acceleration may be required over at least two different connections running over at least two different channels.

In some embodiments, a remote terminal may be configured to include an acceleration agent, for example for TCP acceleration and/or for HTTP acceleration and/or for accelerating any other applicable protocol. Said acceleration agent may be configured to simultaneously support multiple acceleration tunnels towards at least two different acceleration servers, wherein hub 201 may comprise a first acceleration server and a Gateway (e.g. 202) may comprise a second acceleration server.

In another aspect of this invention, management of satellite access communication network 200 may be distributed between the hub 201 and at least one management portal that may be included in a subnet and in some embodiments connected to a Gateway in said subnet. Hub 201 may be configured to manage all network aspects. In some embodiments, hub 201 may be used primarily for managing at least the hub equipment, all aspects related to satellite access and QoS aspects on a subnet level (for example a subnet SLA). Aspects related to user applications (e.g. QoS of applications), networking (e.g. private IP addresses), SLA of remote terminals within a subnet and any other aspect related to an end user's private network may be managed from said management portal. Hence a small-scale network may be easily used by a small organization without requiring knowledge of operating a satellite network but with full control over the parameters affecting the application level.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A system of communicating via a satellite communication network comprising a hub, zero or more independent remote terminals, and at least two subnets:
    wherein a first subnet in the satellite communication network comprises at least one gateway and at least one remote terminal, wherein the at least one gateway is configured to communicate with the at least one remote terminal and with the hub, and the at least one remote terminal is configured to communicate with the at least one gateway and the hub;
    wherein the at least one gateway is configured to transmit a point to multipoint stream towards the at least one remote terminal included in the first subnet using a signal comprised of long transmission bursts overlaying two or more regular transmission timeslots, and to statistically multiplex within a long burst one or more payload units destined to one or more remote terminals included in the first subnet;
    wherein each of the at least two subnets is configured as a private network so that exchange of data between entities belonging to different subnets is blocked; and
    wherein the satellite communication network is configured to share bandwidth between any of the at least two subnets and any of the zero or more independent remote terminals.

2. The system of claim 1, wherein all channels used for transmission by said at least one remote terminal and said at least one gateway in said first subnet share a bandwidth pool.

3. The system of claim 1, wherein at least one channel used for transmission by said at least one remote terminal or said at least one gateway in said first subnet is allocated on a dedicated bandwidth pool.

4. The system of claim 1, wherein the satellite communication network includes a sufficient number of remote terminals and gateways across said at least two subnets to support an efficient use of a demand-assignment-multiple-access (DAMA) access scheme over one or more bandwidth pools.

5. The system of claim 1, wherein the at least one gateway included in the first subnet is configured to simultaneously receive a plurality of bursts transmitted by the at least one remote terminal included in the first subnet.

6. The system of claim 5, wherein a first burst of said plurality of bursts differs from a second burst of said plurality of bursts by any one or more of frequency, symbol rate, modulation or coding.

7. The system of claim 1, wherein a first gateway included in the first subnet comprises:
    an antenna;
    a transmission chain coupled to the antenna, wherein the transmission chain further comprises at least one of a transmission amplifier or a block up converter corresponding to a satellite frequency range;
    a reception chain coupled to the antenna, wherein the reception chain further comprises a low noise block corresponding to the satellite frequency range;
    an RF splitter coupled to the reception chain;
    at least one controller coupled to the transmission chain and the RF splitter, said at least one controller configured to process data received from at least one user application and transmit it to the at least one remote terminal in the first subnet or to the hub, and configured to process data received from the hub or from the at least one remote terminal and transmit it to at least one user application;
    at least one receiver configured to receive transmission of remote terminals, wherein the at least one receiver is coupled to the RF splitter and the at least one controller and wherein the coupling of the at least one receiver and the at least one controller is over a first LAN; and
    a second LAN interface configured to connect the first gateway to one or more user applications.

8. The system of claim 7, wherein the first gateway further comprises a second controller coupled to said RF splitter and to said at least one receiver, wherein the first and second controllers are coupled to said transmission chain via an RF switch, and wherein the first gateway is configured to have only one controller active at any given time.

9. The system of claim 8, wherein the second controller included in the first gateway is configured to:
    monitor the first controller included in the first gateway;
    assume a standby mode upon determining that the first controller is active; and become the active controller upon determining that the first controller malfunctions or is inactive.

10. The system of claim 7, wherein the at least one receiver is configured to:
receive a burst transmitted by a first remote terminal containing data;
decode the received burst and receive the data; and
send the received data to an active controller over the first LAN.

11. The system of claim 7, wherein the at least one receiver is configured to:
tune on a first transmission channel and receive a first burst transmitted from one of the at least one remote terminals;
tune on a second transmission channel and receive a second burst transmitted from one of the at least one remote terminals, wherein the second burst differs from the first burst in any one or more of frequency, symbol rate, modulation or coding; and
wherein the interval between the end of the first burst and the beginning of the second burst does not exceed the interval of a guard between any two transmission timeslots.

12. The system of claim 1, wherein the configuration of each of the at least two subnets as a private network is based on assigning one or more unique virtual LAN identifiers to said subnet.

13. The system of claim 1, wherein the configuration of each of the at least two subnets as a private network is based on using virtual routing.

14. The system of claim 1, wherein the hub is configured to:
receive bandwidth requests from at least one gateway and at least one remote terminal included in the at least two subnets, and from the zero or more independent remote terminals;
process the received bandwidth requests to determine an amount of bandwidth to allocate against each pending bandwidth request using at least one quality-of-service algorithm; and
allocate bandwidth in accordance with a time-frequency plan to the requesting at least one gateway and the at least one remote terminal included in the at least two subnets, and the zero or more independent remote terminals.

15. The system of claim 14, wherein said at least one quality-of-service algorithm regards the zero or more independent remote terminals as constituting at least one virtual subnet.

16. The system of claim 14, wherein the amount of bandwidth to be allocated is determined based on one or more of an amount of bandwidth requested, an amount of bandwidth available for distribution, and service level agreements of the at least two subnets, the at least one gateway and the at least one remote terminal.

17. The system of claim 16, wherein a first service level agreement includes any of a priority characteristic, a committed information rate characteristic, or a maximal information rate characteristic.

18. The system of claim 14, wherein all bandwidth requests received by the hub are processed by a single instance of said at least one quality-of-service algorithm.

19. The system of claim 14, wherein said bandwidth requests are processed by at least two instances of said at least one quality-of-service algorithm, wherein a first instance is used for processing bandwidth requests for transmitting traffic towards the hub, and one or more other instances are used for processing requests for transmitting traffic between gateways and remote terminals included in said at least two subnets.

20. The system of claim 14, wherein processing said received bandwidth requests includes:
aggregating said bandwidth requests for each of the at least two subnets;
determining an aggregated demand for each of the at least two subnets;
determining a subnet service level agreement;
determining total available bandwidth; and
distributing the total available bandwidth to the at least two subnets in accordance with any of a predefined police, the determined subnet aggregated demand, and the determined subnet service level agreement.

21. The system of claim 20, wherein processing the received bandwidth requests further includes distributing bandwidth allocated to each of the at least two subnets between at least one gateway and at least one remote terminal included in said subnet in accordance with any of an amount of bandwidth requested and a service level agreement associated with said at least one gateway and at least one remote terminal.

22. The system of claim 1, wherein a first remote terminal included in the first subnet is configured to receive data transmitted by a second remote terminal in the first subnet without said data being routed via either the hub or the at least one gateway included in the first subnet.

23. The system of claim 1, wherein the zero or more independent remote terminal is configured to receive data transmitted by another independent remote terminal without said data being routed via the hub.

* * * * *